United States Patent [19]

Wyant et al.

[11] Patent Number: 6,085,839
[45] Date of Patent: Jul. 11, 2000

[54] METHOD OF THERMALLY INSULATING A WELLBORE

[75] Inventors: Reece Eugene Wyant; James Jang Woo Nahm, both of Houston, Tex.

[73] Assignee: Shell Oil Company, Houston, Tex.

[21] Appl. No.: 09/170,188

[22] Filed: Oct. 13, 1998

Related U.S. Application Data

[60] Provisional application No. 60/061,937, Oct. 14, 1997.

[51] Int. Cl.[7] ..................................................... E21B 33/13
[52] U.S. Cl. ........................................... 166/292; 166/300
[58] Field of Search ..................................... 166/300, 302, 166/309, 285, 292, 295

[56] References Cited

U.S. PATENT DOCUMENTS

| | | | |
|---|---|---|---|
| 3,525,399 | 8/1970 | Bayless et al. | 166/303 |
| 3,559,738 | 2/1971 | Spillette | 166/303 |
| 3,664,424 | 5/1972 | Penberthy et al. | 166/303 |
| 3,664,425 | 5/1972 | Penberthy et al. | 166/303 |
| 3,718,184 | 2/1973 | Bayless et al. | 166/57 |
| 3,861,469 | 1/1975 | Bayless et al. | 166/303 |
| 4,024,919 | 5/1977 | Pujol | 166/303 |
| 4,204,919 | 5/1980 | Randall et al. | 204/29 |
| 4,534,412 | 8/1985 | Dovan et al. | 166/295 |
| 4,783,492 | 11/1988 | Dovan et al. | 523/130 |
| 5,122,291 | 6/1992 | Wolff et al. | 252/62 |

FOREIGN PATENT DOCUMENTS

| | | | |
|---|---|---|---|
| 875929 | 7/1971 | Canada | 166/53 |
| 1192002 | 8/1985 | Canada | C01B 33/32 |

OTHER PUBLICATIONS

Penberty, W.L., and Bayless, J.H. (1973), "Silicate Foam Wellbore Insulation," *Society of Petroleum Engineers*, Paper 4666.

*Primary Examiner*—Frank Tsay
*Attorney, Agent, or Firm*—Beverlee G. Steinberg

[57] ABSTRACT

There is provided a method for insulating a wellbore comprising providing a wellbore, providing a casing within the wellbore, wherein an annulus is formed between the wellbore and the casing, filling the annulus with an emulsion of liquid sodium silicate and an acid forming agent, increasing a temperature in the annulus, and forming a silica gel in the annulus, the silica gel effective in insulating the wellbore. A steam injection tubing may be provided within the casing, wherein a second annulus is formed between the casing and the steam injection tubing and the second annulus is filled with the emulsion.

20 Claims, No Drawings

METHOD OF THERMALLY INSULATING A WELLBORE

This application claims the benefit of the filing of U.S. Provisional Patent Application Ser. No. 60/061,937 filed Oct. 14, 1997.

FIELD OF THE INVENTION

The invention pertains to a method for insulating a wellbore, in particular insulating a wellbore from temperature rises due to steam injection through very small casing and tubing strings.

BACKGROUND OF THE INVENTION

U.S. Pat. No. 3,525,399 (Bayless et al.), U.S. Pat. No. 3,664,424 (Penberthy, Jr. et al.), U.S. Pat. No. 3,664,425 (Penberthy et al.), U.S. Pat. No. 3,718,184 (Bayless et al.) and U.S. Pat. No. 4,204,919 (Randall, Jr. et al.) teach that a well can be insulated by boiling a sodium silicate solution in contact with a well tubing to form a thin coating of silicate foam on the outside of the tubing string. However, to improve thermal insulation efficiency, excess silicate solution must be water-, gas- or steam lifted from the annulus. If excess sodium silicate solution is not removed from the wellbore, it convects locally and greatly lowers the thermal insulation efficiency of the sodium silicate foam. Although it may be saved for future use, handling of hot alkali solution is extremely dangerous because of its high temperature, high pH and reactivity.

Any advantages of the methods of the prior art are very difficult to obtain when very small tubing and casing is used, for example 3.175 cm (1.250 inch) injection tubing in 6.032 cm (2.375 inch) casing. When such small tubing and casing is used, the injection tubing should be permanently latched into the casing prior to introducing steam. Also, the injection tubing size is too small to install fixtures, such as gas lift valves. Therefore, no mechanism currently remains available to pump out the excess sodium silicate fluid out of the annulus.

SUMMARY OF THE INVENTION

The invention provides a method for insulating a wellbore that has the advantage of effectively insulating a wellbore where very small casing and/or tubing is used. There is provided a method for insulating a wellbore, comprising:

providing a wellbore;

providing a casing within said wellbore, wherein an annulus is formed between said wellbore and said casing;

filling said annulus with an emulsion of liquid sodium silicate and an acid forming agent;

increasing a temperature in the annulus; and forming an expanded silica gel in said annulus, said expanded silica gel effective in insulating said wellbore.

There is further provided a method for insulating a wellbore, comprising:

providing a wellbore;

providing a casing within said wellbore, wherein a first annulus is formed between said wellbore and said casing;

providing a steam injection tubing within said casing, wherein a second annulus is formed between said casing and said steam injection tubing;

filling said second annulus with an emulsion of liquid sodium silicate and an acid forming agent;

injecting steam into said injection tubing, wherein a temperature in the second annulus is increased; and forming an expanded silica gel in said second annulus, said expanded silica gel effective in insulating said casing.

The is still further provided a method for insulating a wellbore, comprising:

providing a wellbore;

providing at least one casing within said wellbore, wherein a first annulus is formed between said wellbore and said casing;

providing at least one steam injection tubing within each said casing, wherein a second annulus is formed between said casing and said steam injection tubing;

filling said second annulus with an emulsion of liquid sodium silicate and an acid forming agent;

injecting steam having a temperature of between the range of 93° C. (200° F.) to 149° C. (300° F.) into said injection tubing;

thermally activating the emulsion of liquid sodium silicate and an acid forming agent, thereby forming an expanded silica gel in said second annulus;

increasing the temperature of said steam;

vaporizing water from said expanded silica gel; and transforming said expanded silica gel to a cellular textured expanded silica gel.

DETAILED DESCRIPTION OF THE PREFERRED EMBODIMENTS

The invention has the advantage of providing an effective and relatively inexpensive wellbore insulating method using liquid sodium silicate and an acid forming agent, such as dimethyl esters. The annulus of the well, and/or the annulus formed between the casing and steam injection tubing, is filled with an emulsion of liquid sodium silicate, an acid forming agent, and optionally an emulsifying agent. The annulus is heated, such as by injecting steam into a steam injection tube contained in the annulus, and an expanded silica gel is formed. Increasing temperatures to greater than 149° C. (300° F.) causes the expanded silica gel to form a light-bodied, cellular texture. This expanded (puffed) light-bodied, cellular silica gel has a low thermal conductivity, which insulates the well. As the steam injection tube is heated to higher temperatures, more water from the gel is boiled off and the dried, expanded silica gel becomes an even better insulator.

The method comprises providing a wellbore and a casing wherein an annulus is formed between the wellbore surface and the outside surface of the casing, filling the annulus with an emulsion of liquid sodium silicate, an acid forming agent, and optionally an emulsifying agent, increasing a temperature in the annulus, and forming an expanded silica gel in the annulus. There may be one or more casing strings in the wellbore, usually sharing a common annulus. The foam completely fills the annulus between the tubing and the casing, providing a thicker layer of insulating material around the tubing, thereby increasing insulating ability, and preventing the circulation of hot gases vertically behind the insulation, which would increase the foams insulating ability. The insulation in a completely filled annulus further helps support the inner tubing, reducing the transmission of temperature induced stresses to the wellhead or to the packer assembly.

The emulsion is formed from a mixture of the liquid sodium silicate (e.g., N®, also known as N-brand, from PQ Corporation), the emulsifier, the acid forming agent, and water. It can be formulated for safe mixing at the surface and safely pumped into the wellbore. The acid forming agent is selected from a dimethyl ester and a glyoxal. When dimethyl esters are used, the esters act as acid generators which undergo hydrolysis to form organic acids. At the resulting lower pH, the sodium silicate forms silica gel. By using varying concentrations of the esters, the sodium silicate mixture may be formulated to set in 1 hour to several days at temperatures between 4° C. (40° F.) and 121° C. (250° F.). The delayed reaction time permits the safe pumping of the mixture into the well before the highly viscous gel forms. The organic esters decompose as the insulation reaches a temperature of about 149–177° C. (300–350° F.), producing $CO_2$ gas. The internally produced gas provides an additional puffing to the insulation, improving it and helping it to fill the annulus. Useful dimethyl esters include dimethyl succinate (DMS), dimethyl glutamate (DMG) and dimethyl adipate (DMA). Examples of acid forming agents include Di isobutyl DBE (di-isobutyl di basic acid esters) (DuPont) and $Me_3$ HTCA (1,3,6-hexane tricarboxylic acid trimethyl ester) (Solutia Inc.) A glyoxal (oxalaldehyde) may be used in place of the ester compound.

Although an emulsion can be formed using a sodium silicate and a dimethyl ester alone, a small quantity of an emulsifier is useful. An example of an effective emulsifier is Neodol® R-173-3, an ethoxylated linear alcohol surfactant available from Shell Chemical.

As the temperature of the emulsion is increased (to about 177° C. (350° F.)), the concentrated silica gel starts to expand (puff or bubble) due to escaping steam. Thus a porous cellular texture is formed and the expanded silica gel provides thermal insulation. The expansion can be carried out in several stages as dictated by well completion operations. Depending on the temperature, the silica gel may be partly expanded initially and then fully expanded as the temperature increases at a later time. The expanded silica gel is insoluble in water and forms a light body of cement-like material with physical strength and excellent bonding quality to steel tubing.

Properties of the expanded silica gel vary with the silica to alkali ratio in the emulsion. A lighter and more uniform structure is formed with the higher silica to alkali ratios. The degree of porosity can be regulated by varying the silica to alkali ratio of the initial sodium silicate solution, the rate of heating, and by incorporation of mineral fillers, fibrous materials, clays, foaming agents, acid generating agents such as dimethyl esters. Control of cell size and achievement of low densities may also depend on the conditions mentioned above.

In another embodiment of the invention, a steam injection tubing is provided within the casing, forming a second annulus between the inside surface of the casing and the outside surface of the steam injection tubing. Either the second annulus alone, or alternatively both the first and second annulus, is filled with the emulsion and steam is injected into the injection tubing, heating up the annuluses. Multiple steam injection tubes may also be provided within the same wellbore. The multiple steam injection tubes may be within the same casing, sharing a common annulus, or each steam injection tube may be surrounded by its own casing with the insulation being formed in the annulus between each steam injection tubing and each casing. When both the first and second annulus are to be filled with the emulsion, the first annulus should be filled and set first, to allow heat transfer to occur from the steam injection tubes across the second annulus, through the casing, and into the first annulus.

The expanded silica gel becomes strongly bonded to the injection tubing and the casing. The dried silica gel is porous yet physically strong enough to support the steam injection tubing in the casing.

EXAMPLE 1

An immersion heating tube was made by forcing a 13 cm (5 inch) long, 1.3 cm (0.5 inch) diameter, 115 volt, 500 watt electrical heating cartridge down to about 1.90 cm (0.75 inch) from the bottom of a closed end, 25 cm (10 inch) long, 1.59 cm (0.63 inch) OD×1.3 cm (0.5 inch) ID stainless steel tube. A stainless steel sheathed thermocouple was tied with wires to the outer surface of the heating tube approximately 7.6 cm (3.5 inch) from the bottom. A reaction vessel 20 cm (8 inch) long×4.77 cm (1.88) ID was made by cutting off a 500 ml glass graduated cylinder at the 350 ml mark.

An activated sodium silicate solution was made by mixing 100 ml N-brand sodium silicate, 100 ml water and 30 ml DMA together in the glass cylinder. An unstable emulsion was formed with the dispersed DMA rising slowly through the silicate solution.

The heating tube (simulating a steam injection tube) was immersed to within 0.64 cm (0.25 inch) of the cylinder bottom and the full voltage was applied through a Rheostat. The thermocouple was partly cooled by the convecting fluid and boiling occurred at the heater surface while the thermocouple read about 93° C. (200° F.).

By the time the thermocouple read about 102° C.–110° C. (215° F.–230° F.) there was vigorous convection and boiling in the upper part of the cylinder and the entire upper part gelled and solidified within a period of about 10 seconds.

After the rapid set the rheostat was reduced to give a slower temperature rise. The temperature was raised to 316° C. (600° F.) in about 5 minutes at about 80 volts. Drying the silica gel was evidenced by steam rising from the top.

As the drying progressed, the voltage necessary to maintain 316° C. (600° F.) dropped to about 37 volts. Also, heat transmitted to the bottom of the heater tube boiled the clear fluid below the silica gel producing a void space below the silica gel of about 1.90 cm (0.75 inch). The solidified tube assembly was placed in a 1 16° C. (240° F.) oven, and any free water was dried out overnight.

Tests were then run to indicate the insulating ability of the dried silica gel. A second thermocouple was wired to the glass cylinder's outer surface directly out from the first thermocouple and was covered with a 0.32 cm (0.12 inch) thick patch of fiber glass insulating material. Voltage was applied to the heater and the inner temperature was raised to 316° C. (600° F.) and held constant. The temperatures of the thermocouples were recorded. As the following table shows, excellent thermal insulation was obtained.

TABLE 1

| | Heating Tube Model | | | |
|---|---|---|---|---|
| Time (min:sec) | Rheostat Reading | Voltage (volt) | Inner Temp (° C. (° F.)) | Outer Temp (° C. (° F.)) |
| 0:00 | 50 | 67 | 27 (80) | 27 (80) |
| 3:00 | 50 | 67 | 259 (498) | 27 (80) |
| 4:00 | 40 | 54 | 304 (579) | 31 (88) |
| 4:20 | 30 | 40 | 319 (607) | 37 (99) |

TABLE 1-continued

Heating Tube Model

| Time (min:sec) | Rheostat Reading | Voltage (volt) | Inner Temp (° C. (° F.)) | Outer Temp (° C. (° F.)) |
|---|---|---|---|---|
| 5:40 | 25 | 34 | 327 (620) | 43 (110) |
| 9:00 | 26 | 35 | 316 (601) | 63 (145) |
| 14:40 | 24 | 32 | 324 (616) | — |
| 19:00 | 23 | 31 | 323 (614) | 83 (182) |
| 41:00 | 24 | 32 | 307 (584) | 85 (185) |
| 67:00 | 24 | 32 | 320 (609) | 90 (194) |
| 96:00 | 23.5 | 31.7 | 328 (623) | 89 (193) |
| 135:00 | 23.5 | 31.7 | 309 (589) | 89 (192) |

From above data thermal conductivity of the dried silica gel was calculated to be 0.053 Btu/(hr-ft-° F.) at 316° C. (600° F.). As an example, a normal density Class G cement containing 40% silica flour had a thermal conductivity of 0.533 Btu/(hr-ft-° F.) at 287° C. (548° F.).

EXAMPLE 2

A test was carried out using a 3-ft steel model. The model consisted of a first steel pipe 3.18 cm (1.25 inch) OD×2.74 cm (1.08 inch) ID×102 cm (40 inch) long inside a second steel pipe 6.03 cm (2.38 inch) OD×5.38 cm (2.12 inch) ID×91 cm (36 inch) long. The pipes were welded concentrically to a 10 cm (4 inch) square, 0.32 cm (0.12 inch) thick steel plate. A 1.90 cm (0.75 inch) hole was drilled through the center of the bottom plate to pass an electrical lead to a heater. An 800 watt rod heater, 0.48 cm (0.19 inch) diameter×81 cm (32 inch) long (with a heated length of about 74 cm (29 inch)) was held in the inner pipe using steel centralizing clips. A spring clip held the tip of a thermocouple against the inner wall of the inner pipe at about the mid-height of the heater. The 1.27 cm (0.75 inch) hole through the plate was filled with insulating tape wrapped around the lower electrical lead and the inner pipe was then filled with 40–60 mesh sand to conduct heat from the rod heater to the inner pipe. A second thermocouple was taped to the outside of the outer pipe in an opposing position to the inner thermocouple.

An activated sodium silicate was prepared by mixing 1198 ml N-Brand sodium silicate, ml DBE-6 (dimethyl adipate obtained from DuPont, 5% based on volume of sodium silicate) and 6 ml Neodol R-173-B (0.5% based on volume of sodium silicate). The DBE-6 (dimethyl adipate) activator is not water soluble and is difficult to emulsify in the sodium silicate solution. The Neodol R-1 73-B was used to facilitate a good emulsification and to prevent separation of the DBE-6 during the heating process. The resulting sodium silicate emulsion was poured into the annulus between the inner and outer pipe to a level of about 90% of the annulus height, and the model was heated by applying a voltage to the heater using a variable rheostat. The heating is summarized in Table 2.

TABLE 2

Pipe Model

| Time (Min) | Rheostat Reading | Inner Temp (° C. (° F.)) | Outer Temp (° C. (° F.)) |
|---|---|---|---|
| 0 | 80 | 24 (75) | 24 (76) |
| 10 | 80 | 99 (211) | 46 (115) |
| 19 | 80 | 136 (277) | 77 (171) |
| 31 | 80 | 150 (302) | 95 (203) |
| 35 | 80 to 100 | 156 (313) | 96 (204) |
| 48 | 100 to 90 | 264 (507) | 1041 (220) |
| 61 | 90 to 75 | 314 (597) | 120 (249) |
| 63 | 75 to 80 | 318 (605) | 120 (249) |
| 65 | 80 to 85 | 317 (603) | 120 (249) |
| 105 | 70 | 357 (674) | 158 (316) |
| 258 | 67 | 347 (656) | 169 (336) |

The large temperature difference across the thin annulus shows that an excellent insulation was obtained. After cooling, the model was cut into sections to visually examine the texture and placement of the expanded silica gel. A soft fluffy texture and a good filling through the heated section was obtained.

The particular sodium silicate sample used for Example 2 was thinner than normal, having a viscosity of 31 cp. Sodium silicate emulsion samples were prepared with the 5% DBE-6 (as Example 2) and with 10% DBE-6 to check the gelling times at ambient conditions. The initial rheological data as measured with a Fann 35 viscometer were as follows:

| | 5% DBE-6 | 10% DBE-6 |
|---|---|---|
| Plastic Viscosity, cp | 37 | 39 |
| Yield Point, N/mm$^2$ (lb/100 ft$^2$) | $1.44 \times 10^{-4}$ (3) | $1.44 \times 10^{-4}$ (3) |
| 10 Second Gel Strength, lb/100 ft$^2$ | $4.78 \times 10^{-5}$ (1) | $4.78 \times 10^{-5}$ (1) |
| 10 Minute Gel Strength, lb/100 ft$^2$ | $9.57 \times 10^{-5}$ (2) | $9.57 \times 10^{-5}$ (2) |

The Fann 35 Viscometers were then left rotating at 300 rpm and readings (apparent viscosity in cp) were taken intermittently. The times include the initial viscosity data shown above. The time vs. Fann 300 rpm readings are as follows:

| Time (minute) | Emulsion 5% DBE-6 | Emulsion 10% DBE-6 |
|---|---|---|
| 0 | 40 | 42 |
| 21 | 41 | 42 |
| 62 | 47 | 50 |
| 81 | 51 | 55 |
| 102 | 60 | 65 |
| 118 | 72 | 80 |
| 144 | 110 | 125 |
| 162 | 190 | 233 |
| 170 | 293 | 300 |
| 172 | 300 | |

It can be seen that the viscosity increases with time, slowly at first and then rapidly after about 2.5 hours.

The same 5% and 10% DBE-6 samples were run in an atmospheric consistometer to measure their thickening times at 49° C. (120° F.). Both samples had the initial thickening times of 69 minutes after mixing with all of the viscosity increase coming within the last 5 minutes of the test.

EXAMPLE 3

An experiment was carried out in order to demonstrate that pumping time can be extended by reducing the concentration of DBE-6 for safe mixing and pumping of the sodium silicate emulsion in the field.

An emulsion containing N-brand sodium silicate plus 2.5% DBE-6 and 0.5% Neodol R-173B remained fluid after rolling for more than 4 days in a 93° C. (200° F.) ven and for more than 24 hours rolling in a 121° C. (250° F.) oven.

In general, the reaction time of the sodium silicate/DBE-6 emulsion is decreased by increasing temperature. After reaction, the viscosity of the gelled material is reduced by increasing temperature. In this example, only 2.5 % DBE-6 was added to provide a long pump time and the silica gel formed was a weak gel. As the temperature is increased in the well, the gel will retain its ability to flow until enough water has been evaporated to produce a hard non-flowable gel.

Other embodiments of the invention will be apparent to those skilled in the art from a consideration of this specification or from practice of the invention disclosed. It is intended that the specification be considered as exemplary only, with the true scope and spirit of the invention being indicated by the following claims.

We claim:

1. A method for insulating a wellbore, comprising:
   providing a wellbore;
   providing a casing within said wellbore, wherein an annulus is formed between said wellbore and said casing;
   filling said annulus with an emulsion of liquid sodium silicate and an acid forming agent;
   increasing a temperature in the annulus; and
   forming an expanded silica gel in said annulus, said expanded silica gel effective in insulating said wellbore.

2. A method according to claim 1 wherein said acid forming agent is selected from a dimethyl ester, a glyoxal, and mixtures thereof.

3. A method according to claim 2 wherein said dimethyl ester is selected from dimethyl succinate, dimethyl glutamate, dimethyl adipate, and mixtures thereof.

4. A method according to claim 2 wherein said emulsion further comprises an emulsifying agent.

5. A method according to claim 2 further comprising further increasing the temperature, boiling off water in said expanded silica gel, and transforming said expanded silica gel to a cellular textured expanded silica gel.

6. A method according to claim 5 wherein at least two casing are provided.

7. A method for insulating a wellbore, comprising:
   providing a wellbore;
   providing a casing within said wellbore, wherein a first annulus is formed between said wellbore and said casing;
   providing a steam injection tubing within said casing, wherein a second annulus is formed between said casing and said steam injection tubing;
   filling said second annulus with an emulsion of liquid sodium silicate and an acid forming agent;
   injecting steam into said injection tubing, wherein a temperature in the second annulus is increased; and
   forming an expanded silica gel in said second annulus, said expanded silica gel effective in insulating said casing.

8. A method according to claim 7 wherein said acid forming agent is selected from a dimethyl ester, a glyoxal, and mixtures thereof.

9. A method according to claim 8 wherein said dimethyl ester is selected from dimethyl succinate, dimethyl glutamate, dimethyl adipate, and mixtures thereof.

10. A method according to claim 8 wherein said emulsion further comprises an emulsifying agent.

11. A method according to claim 8 further comprising further increasing the temperature, and boiling off water in said expanded silica gel, and transforming said expanded silica gel to a cellular textured expanded silica gel.

12. A method according to claim 8 wherein said first annulus is also filled with an emulsion of liquid sodium silicate and an acid forming agent.

13. A method according to claim 12 wherein said emulsion further comprises an emulsifying agent.

14. A method according to claim 7 wherein at least two injection tubing are provided.

15. A method according to claim 14 wherein at least two casing are provided, each casing surrounding at least one injection tube.

16. A method for insulating a wellbore, comprising:
   providing a wellbore;
   providing at least one casing within said wellbore, wherein a first annulus is formed between said wellbore and said casing;
   providing at least one steam injection tubing within each said casing, wherein a second annulus is formed between said casing and said steam injection tubing;
   filling said second annulus with an emulsion of liquid sodium silicate and an acid forming agent;
   injecting steam having a temperature of between the range of 93° C. (200° F.) to 149° C. (300° F.) into said injection tubing;
   thermally activating the emulsion of liquid sodium silicate and an acid forming agent, thereby forming an expanded silica gel in said second annulus;
   increasing the temperature of said steam;
   vaporizing water from said expanded silica gel; and
   transforming said expanded silica gel to a cellular textured expanded silica gel.

17. A method according to claim 16 wherein said acid forming agent is selected from a dimethyl ester and a glyoxal.

18. A method according to claim 17 wherein said dimethyl ester is selected from dimethyl succinate, dimethyl glutamate, dimethyl adipate, and mixtures thereof.

19. A method according to claim 17 wherein said first annulus is also filled with an emulsion of liquid sodium silicate and an acid forming agent.

20. A method according to claim 16 wherein said emulsion further comprises an emulsifying agent.

* * * * *